United States Patent

Krauss et al.

[11] 4,297,080
[45] Oct. 27, 1981

[54] ROTOR BLADE PITCH CONTROL LINKAGE

[75] Inventors: Timothy A. Krauss, Sandy Hook; Stephan Roman, Shelton, both of Conn.

[73] Assignee: United Technologies Corporation, Hartford, Conn.

[21] Appl. No.: 104,605

[22] Filed: Dec. 17, 1979

[51] Int. Cl.³ .................................... B64C 27/38
[52] U.S. Cl. .................. 416/141; 416/114; 416/138; 416/168 R
[58] Field of Search ............ 416/134 A, 123, 138A, 416/141, 105, 230 A, 168 R, 168 A, 114, 159, 163, 226

[56] References Cited

U.S. PATENT DOCUMENTS

| | | | |
|---|---|---|---|
| 1,676,572 | 7/1928 | Oehmichen | 416/141 |
| 1,840,148 | 1/1932 | Berry | 416/168 X |
| 3,254,725 | 6/1966 | Higgins | 416/168 X |
| 4,222,709 | 9/1980 | Mouille | 416/134 A |

FOREIGN PATENT DOCUMENTS

| | | | |
|---|---|---|---|
| 1009222 | 5/1952 | France | 416/168 |
| 1232934 | 10/1960 | France | 416/168 |
| 857462 | 12/1960 | United Kingdom | 416/141 |
| 916310 | 1/1963 | United Kingdom | 416/168 |

Primary Examiner—Everette A. Powell, Jr.
Attorney, Agent, or Firm—Vernon F. Hauschild

[57] ABSTRACT

In a helicopter rotor, a blade control linkage is externally supported on the rotor hub and connected to the root end of a torque tube to provide torsion inputs to the blade by twisting the flexible spar member, which is enveloped by the torque tube and joined to the torque tube at a predetermined blade radial location. The linkage forms a parallelogram with the torque tube, and short vertical ball joint mounted links incline in two directions to accommodate blade lead/lag and flapping motions without introducing pitch coupling.

6 Claims, 5 Drawing Figures

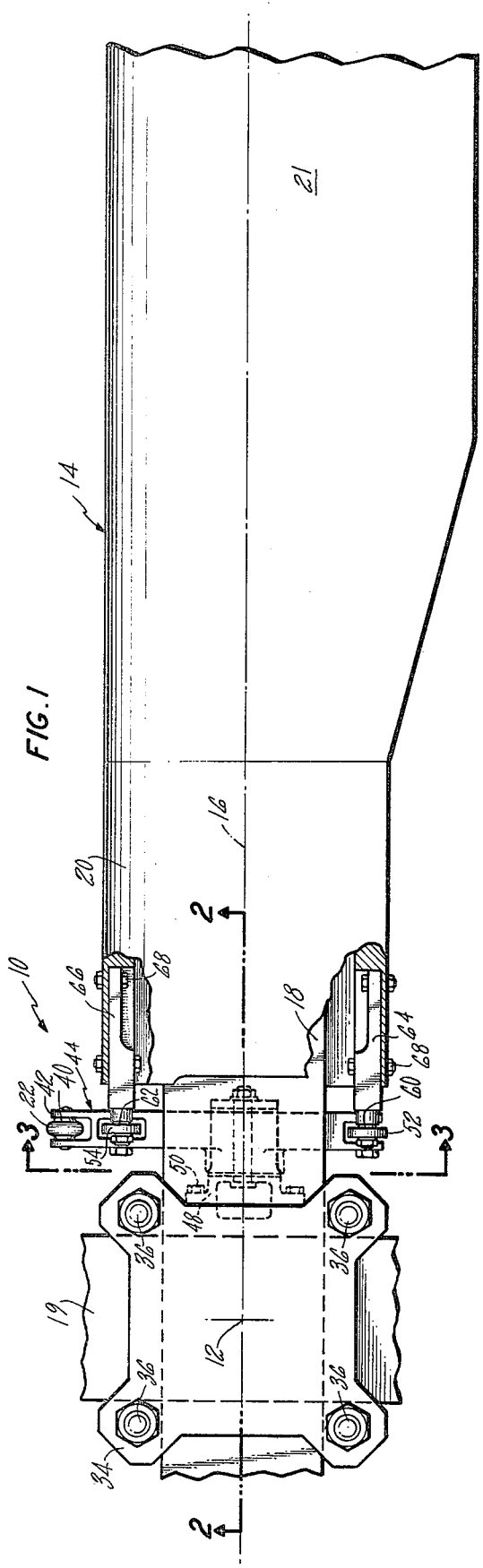

– 4,297,080 –

ROTOR BLADE PITCH CONTROL LINKAGE

BACKGROUND OF THE INVENTION

1. Field of the Invention

This invention relates to a helicopter rotor of the bearingless type, having an airfoil shaped blade attached to a flexible spar, specifically designed and fabricated to accommodate the torsion deflections of pitch change, and the bending requirements due to lead/lag and flap/droop blade excursions. This invention is specifically directed to the group of bearingless rotors wherein the flexible spar is rotatably driven by suitable attachment to the rotor hub and rotor drive shaft. The specific geometric shape of the spar is not important to this invention, and is shown in the accompanying figures as rectangular. Likewise, it is not important whether the spar be continuous across the rotor axis to attach to opposed blades, or whether each spar be unitary and joined only to one blade. For the latter configuration there may be an odd number of blades.

2. Description of the Prior Art

Prior art patents familiar to the inventors and pertaining to hingeless rotor blade attachments and controls have generally been directed to tail rotor applications where pitch, lead/lag and flapping motions are less than those of main rotors. In attempting to transfer rotor technology developed for tail rotors to a main rotor application, concern had to be addressed to the adverse influence of these larger excursions, and especially to the pitch coupling effect due to inplane or lead/lag blade motions. The longer, wider, and heavier main rotor blade undergoes significant bending in first advancing into the direction of flight and then retreating from it as it completes it cycle of rotation at a constant driven rotor speed and undergoing commanded cyclic pitch changes as well as being impinged upon by wind gusts at any point on the azimuth. Starting and stopping produces still further inplane bending. The concept of using blade motions to introduce a proportional blade pitch change in a direction to stabilize the blade is known, as well as the concept of elimination or prevention of such pitch coupling.

A specific rotor configuration to which our invention may be applied is shown in U.S. Pat. No. 4,008,980 to Noehren et al, which is used in the UH-60A helicopter. The specific "snubber bearing" of that rotor head is depicted as FIG. 5 in U.S. Pat. No. 4,087,203 to Ferris.

The main objective of the teaching of this latter patent is similar to that of our invention; namely to provide structure that accommodates pitch change relative motion (torsion) between the flexible spar and rigid torque tube, minimizes the pitch coupling effect of the blade flapping wherein relative bending takes place between the spar and torque tube, and prevents pitch change motions due to lead or lag excursions when blade spar inplane motion occurs relative to the torque tube.

In an embodiment wherein blade pitch change is introduced by means of a torque tube enveloping a flexible spar, and wherein the attachment to the rotor hub follows the teaching of the U.S. Pat. No. 3,874,815 to Baskin, use of this invention also appears beneficial, provided the linkage is suitably mounted at the virtual hinge axis of the blade spar such that the root end of the torque tube can be restrained from vertical motion.

SUMMARY OF THE INVENTION

This invention presents an improved configuration over the prior art embodiment of U.S. Pat. No. 4,087,203 and retains all of the objectives of that earlier embodiment; namely the isolation of flap and lead/lag motions of the flexible spar from pitch change motions. There were two driving influences that led to a need for the improvement presented here. The first was the high cost involved in fabrication of a bearing requiring two sliding surfaces, but small enough to fit within the envelope of the torque tube. Specialized high tolerance parts resulted, especially for the spherical bearing portion. The second, and not necessarily secondary, adverse aspect of the initial embodiment is that all bearing loads are transmitted from the torque tube into the hub through the spar, thus requiring that the spar be designed to sustain such loads. Our improved embodiment is located external to the torque tube for ease in inspection and maintenance, and utilizes simple links connected by joints in the form of standard self-aligning rod end bearings, and a conventional ball or roller bearing. The pitch link shear load by-passes the spar and is reacted directly by the bellcrank bearing in the hub. Similarly, there are no other bearing loads transferred through the spar, inasmuch as the links connect from torque tube to hub directly. Likewise, since our improved support provides no lateral restraint to torque tube motions, loads on the torque tube are minimized.

Other objects and advantages of the present invention may be seen by referring to the following description and claims, read in conjunction with the accompanying drawings.

BRIEF DESCRIPTION OF THE DRAWINGS

FIG. 1 is a plan view of a four-bladed helicopter rotor of the cross-beam configuration, with one blade illustrated, and illustrating our control linkage.

FIG. 2 is a cross-sectional view taken along the lines 2—2 of FIG. 1 which further illustrates the mounting of our external linkage.

FIG. 3 is a cross-sectional view taken along the lines 3—3 of FIG. 1 to show the connection of our control linkage to the standard vertical pitch input.

DESCRIPTION OF THE PREFERRED EMBODIMENT

Figure 5:
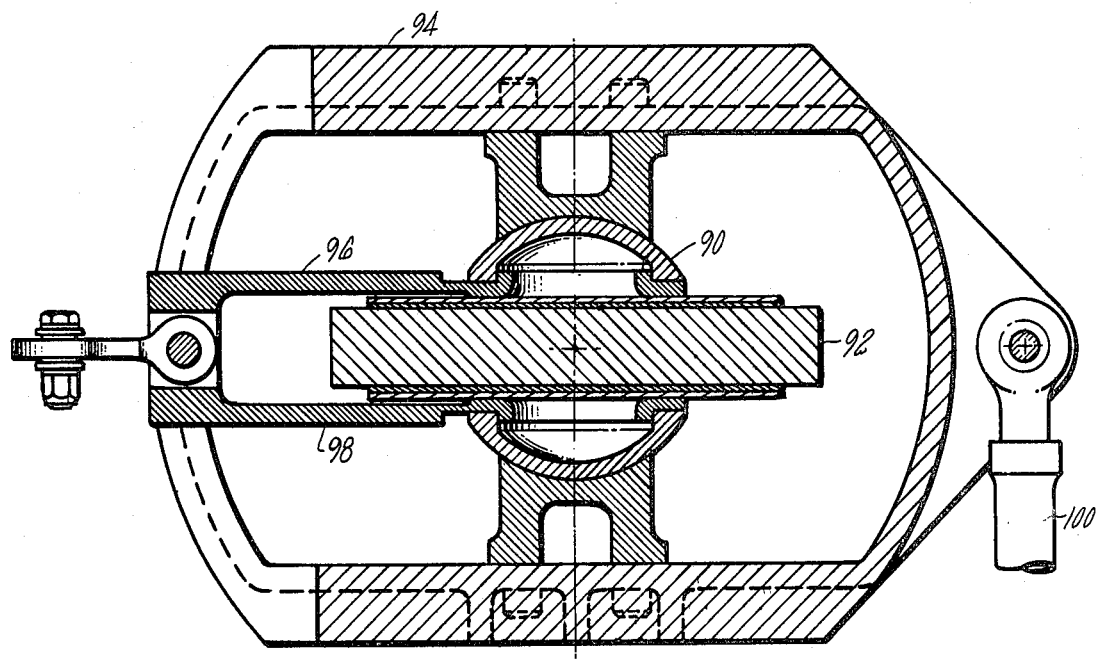
FIG. 5 is a cross-sectional showing of the prior art configuration covered by U.S. Pat. No. 4,087,203.

The invention is illustrated in FIG. 1, incorporated in a helicopter main or tail rotor 10 depicted to rotate counterclockwise about vertical axis 12. An even number of rotor blades 14 (one shown only in partial form) extend in opposite directions and are supported for pitch change motion about feathering axis 16. In this configuration, two opposed pairs of blades have a common supporting flexible spar 18 to react all blade loads including centrifugal force, and to react the torsional motion of pitch change, the flatwise bending motions of flapping and droop, and the edgewise bending motions of lead or lag. While a rectangular spar 18 is depicted herein, the geometric shape of the spar may be varied to suit the designers' requirements of stiffness in the various directions. The spar 18 is rigidly attached to the airfoil portion 21 of the blade proper at a predetermined radial position, and is free to twist and bend as aforementioned between that rigid joint and the inboard station where it is clamped to the rotor hub and crosses over or under the spar joining the second set of opposed blades.

As in the prior art cross beam rotors, a torque tube 20, which forms the inner end of blade airfoil portion 21, envelops the spar 18, and provides pitch change inputs to the blade at the radial joint where the spar is attached to the airfoil proper. The pitch change inputs initiated by the pilot are introduced by a vertical pitch rod 22 suitably connected to the inner end of the torque tube 20. That connection between the torque and the pitch rod as described hereinafter in greater detail forms an important part of this invention and allows for elimination of any other member or device connecting the rigid torque tube to the flexible spar.

Rotor drive from a conventional gear train rotates drive shaft 30 in a counterclockwise direction, as indicated in FIG. 1. Plate 32 is formed integrally with drive shaft 30 and is formed with a recess to receive lower spar 19. Upper plate 34 is formed similar to plate 32 and is formed with a recess to receive upper spar 18. The plates 32 and 34 are joined by four bolts 36 located externally of the passing spars. By this clamping arrangement, rotor drive between drive shaft 30 and blades 14 is accomplished through spars 18 and 19. Vertical pitch change rod 22 extends from a conventional rotating swash plate 41 to connect by means of a ball joint 40 to a bifurcated end 42 of bell crank 44. The joint 40 is located on the leading edge side of blade 14 and torque tube 20. Bell crank 44 is pivotally connected by bearing 46 at substantially its mid-point to lower hub plate 32 through bracket 48 and bolts 50. As best shown in FIG. 3, short links 52 and 54 are connected at their lower ends by rod end spherical bearings 56 and 58 to opposite ends of bell crank 44, and at their upper ends by similar rod end spherical bearings 60 and 62 to extension rods 64 and 66, which are rigidly attached to the leading and trailing edges of the torque tube 20 by bolts 68, located coplanar to the spar 18. Bell crank 44, links 52 and 54, and torque tube 20 form a parallelogram linkage 55, which provides vertical restraint, with allowance for some lateral movement of torque tube 20.

OPERATION

Pilot pitch change inputs made by vertical motion of rod 22 pivot bell crank 44 and serve to rotate torque tube 20 about pitch axis 16, thus twisting spar 18 along its unsupported length between its inboard clamped station and its blade attachment joint. The use of the externally located parallelogram linkage, using conventional self-aligning bearings is sufficient supportive structure for the torque tube, and eliminates the prior art need for a direct support between the torque tube and spar. When the blade 14 leads or lags from its normal radially extended position, the flexible spar 18 (or 19) bends in an inplane direction in proportion to its designed and fabricated stiffness in that direction, relative to the extremely rigid torque tube 20, and causes the inboard end of the torque tube to shift laterally in the opposite direction. While sufficient lateral clearance must be provided between the spar and torque tube for the torque tube to shift without interference, it should be noted that the pitch radius, or distance between input joint 40 and pivot bearing 46 remains constant regardless of the lateral position of the torque tube. Thus, it may be noted that blade lead or lag excursions that translate the inner end of the torque tube, will have no significant coupling effect on blade pitch. The slight foreshortening of the width of the parallelogram by the lateral inclination of links 52 and 54 is not felt to be extensive enough to introduce any adverse effects on blade tracking or other operational characteristics.

Figure 4:
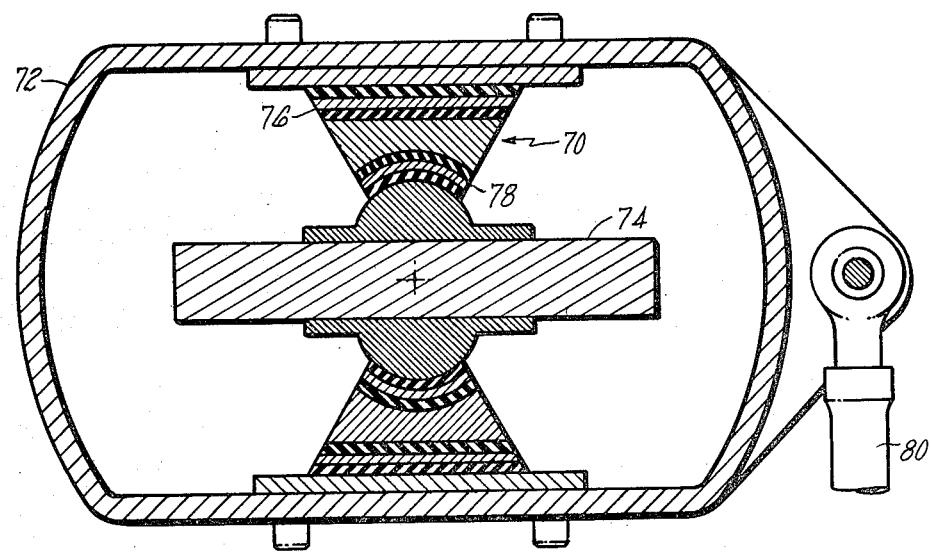
FIG. 4 is a cross section of a prior art configuration.

The second blade motion that must be accommodated without coupling or interference is that due to blade flapping in flight. Again, sufficient clearance, in this case vertical clearance, must be allowed for relative motion between the spar and the torque tube. As the flexible spar 18 bends upward within the confines of and relative to the torque tube 20, there will be a radial shifting of the torque tube inwardly due to the foreshorting of the spar 18 due to its bending, although vertical motion of the root end of the torque tube is prevented. The vertical links 52 and 54 serve to restrain the torque tube substantially in the plane of the spar 18, and the universal bearing joints 56, 58, and 60, 62 at the ends of the vertical links 52 and 54 will allow an angular inclination of the links 52 and 54, thus tilting the parallelogram slightly but not introducing adverse blade performance factors. As explained in U.S. Pat. No. 4,087,203, and illustrated in FIG. 4 of this specification, the structure of the "snubber" 70 connecting the inner wall of the root end of the torque tube to the spar 74 serves sufficiently to restrain the torque tube from vertical motions induced by blade flapping that would introduce pitch coupling, while the flat elastomeric bearing portion 76 allows radial motion between torque tube and spar when such blade flapping occurs. Also, the spherical bearing 78 allows torsional pitch change inputs to be made without interference through the torque tube by means of vertical rod 80. However, as also discussed in U.S. Pat. No. 4,087,203, lateral shifting of the torque tube 72 relative to the spar 74 due to lead/lag excursions of the blade can take place, and will increase or decrease the pitch radius, and thus introduce undesired pitch coupling.

The configuration shown in FIG. 5 of this specification is the embodiment prescribed by U.S. Pat. No. 4,087,203 to overcome the aforementioned lead/lag pitch coupling of the FIG. 4 structure. Two bearing surfaces are presented. Spherical bearing 90 allows torsional pitch change inputs without constraint by the root end of spar 92, similar to the spherical elastomeric bearing 78 of the FIG. 4 configuration. To prevent lead/lag pitch coupling, sliding action is allowed to occur between the spar 92 and torque tube 94 by means of arms 96 and 98 rigidly attached to the torque tube 94. Since lateral translation of torque tube 94 due to blade lead/lag excursions will also shift the spherical bearing 90, there will be no change in the length of the radius arm from the bearing 90 to the connection of the vertical pitch rod 100. Thus there will be no lead/lag pitch coupling.

The advantages over the prior embodiment illustrated in U.S. Pat. No. 4,087,203 have been discussed above, and our invention has the further practical aspect of using conventional bearings with their advantage of low cost, widespread availability, prior full development, and proven performance. In comparing the prior art configurations of FIGS. 4 and 5 to this improvement, it is evident that the removal of the spar member from the load path between the torque tube and rotor hub is desirable. Not only may the spar be designed without need to provide stress and reaction tolerance to such loads, but wear conditions are eliminated. Further, it is recognized that as more sophisticated or complex geometric shapes for the spar are introduced beyond the symmetrical rectangular shape shown in FIG. 3, the difficulties of creating an effective linear bearing surface as required by the embodiment of U.S. Pat. No. 4,087,203 are completely eliminated. Since our support for the torque tube does not have to be packaged between the torque tube and spar, the size of the torque tube is substantially reduced.

We wish it to be understood that we do not desire to be limited to the exact details of construction shown and described, for obvious modifications will occur to a person skilled in the art.

We claim:

1. A helicopter rotor having:
   (A) a hub mounted for rotation about an axis,
   (B) at least one blade extending radially from said hub and supported therefrom for rotation therewith and including:
      (1) a radially extending flexible spar member connected to the hub to be rotatable therewith,
      (2) an airfoil section supported from the spar for rotation therewith, and including:
         (a) a torque tube enveloping the flexible spar and connected thereto at a radial station therealong and extending inwardly from said radial station to form the inner end of the airfoil sections
   (C) pitch control and support means connected to the inner end of the torque tube and forming a parallelogram therewith including:
      (1) a bell crank pivotally connected to the hub, and
      (2) two side link members of equal length connecting opposite ends of the bell crank to the torque tube to thereby form a substantially vertically oriented parallelogram linkage among said bell crank, side links, and torque tube.

2. A helicopter rotor according to claim 1 wherein the side link members are substantially vertical oriented links each attached to the torque tube and to the bell crank by universal joints.

3. A helicopter rotor according to claim 2 wherein the side links are attached to the torque tube at the leading and trailing extremities of the torque tube, and are attached to the bell crank at stations equidistant from the pivotal connection of the bell crank to the rotor hub.

4. A helicopter rotor according to claim 3, and including input means connected to said bell crank to cause said bell crank to pivot and thereby cause said torque tube to move therewith to thereby cause said blade to change pitch due to the flexing of said spar.

5. In a helicopter cross beam rotor having a hub, and a plurality of blades, each blade having a flexible spar enveloped by a rigid torque tube, wherein relative motion occurs between the torque tube and spar upon rotor blade pitch change, lead/lag, and flapping motions, an improved support means at the inner end of the torque tube providing vertical restraint and lateral freedom comprising a bell crank and two pitch links, the bell crank pivotally supported on the hub, the two links oriented substantially vertically with the upper ends of each connected by ball joints to the torque tube, their lower ends connected to opposite ends of the bell crank by ball joints, and the bell crank having a connection to receive inputs from the helicopter pitch control system.

6. The improved support of claim 5 wherein the torque tube, bell crank, and two vertical pitch links form a parallelogram, the pitch links being of equal lengths and connected to the torque tube in the plane of the spar, and at the leading and trailing edges of the torque tube.

* * * * *